United States Patent
Tan et al.

(10) Patent No.: US 11,194,781 B2
(45) Date of Patent: Dec. 7, 2021

(54) METHOD, APPARATUS AND SYSTEM FOR UPDATING GEOMAGNETIC INFORMATION

(71) Applicant: Tencent Technology (Shenzhen) Company Limited, Shenzhen (CN)

(72) Inventors: Kaitian Tan, Shenzhen (CN); Yi Zhu, Shenzhen (CN); Chang Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 9 days.

(21) Appl. No.: 16/892,028

(22) Filed: Jun. 3, 2020

(65) Prior Publication Data
US 2020/0293508 A1 Sep. 17, 2020

Related U.S. Application Data

(63) Continuation of application No. PCT/CN2019/073012, filed on Jan. 24, 2019.

(30) Foreign Application Priority Data

Feb. 8, 2018 (CN) .......................... 201810129197.7

(51) Int. Cl.
*G06F 16/23* (2019.01)
*H04W 4/029* (2018.01)
(Continued)

(52) U.S. Cl.
CPC ............. *G06F 16/23* (2019.01); *G01C 21/08* (2013.01); *G01C 21/206* (2013.01); *H04W 4/029* (2018.02); *H04W 4/33* (2018.02)

(58) Field of Classification Search
CPC ....... G01C 21/206; G01C 21/08; H04W 4/33; H04W 4/025
See application file for complete search history.

(56) References Cited

U.S. PATENT DOCUMENTS

2016/0084659 A1    3/2016 Yang et al.

FOREIGN PATENT DOCUMENTS

| CN | 103175529 A | 6/2013 |
| CN | 103869350 A | 6/2014 |

(Continued)

OTHER PUBLICATIONS

Tencent Technology, ISR, PCT/CN2019/073012, Apr. 29, 2019, 2 pgs.
(Continued)

*Primary Examiner* — Nam T Huynh
(74) *Attorney, Agent, or Firm* — Morgan, Lewis & Bockius LLP

(57) ABSTRACT

Embodiments of present disclosure disclose a method for updating geomagnetic information performed at a computing device, which belong to the field of electronic technologies. The method includes: receiving target geomagnetic information and target location assistance information that are transmitted by a terminal during positioning; determining a target geographical location corresponding to the target location assistance information in a case that geomagnetic information corresponding to a current geographical location of the terminal is invalid; and updating geomagnetic information corresponding to the target geographical location according to the target geomagnetic information in a prestored correspondence between a geographical location and geomagnetic information. According to the embodiments of the present disclosure, efficiency of updating geomagnetic information can be improved.

20 Claims, 5 Drawing Sheets

(51) Int. Cl.
    *G01C 21/08*     (2006.01)
    *G01C 21/20*     (2006.01)
    *H04W 4/33*     (2018.01)

(56) References Cited

FOREIGN PATENT DOCUMENTS

| | | | |
|---|---|---|---|
| CN | 107621263 A | 1/2018 | |
| EP | 3184963 A1 * | 6/2017 | .............. H04W 4/33 |

OTHER PUBLICATIONS

Tencent Technology, WO, PCT/CN2019/073012, Apr. 29, 2019, 4 pgs.
Tencent Technology, IPRP, PCT/CN2019/073012, Aug. 11, 2020, 5 pgs.

* cited by examiner

METHOD, APPARATUS AND SYSTEM FOR UPDATING GEOMAGNETIC INFORMATION

CROSS-REFERENCE TO RELATED APPLICATIONS

This application is a continuation application of PCT Application No. PCT/CN2019/073012, entitled "METHOD, APPARATUS, AND SYSTEM FOR UPDATING GEOMAGNETIC INFORMATION" filed on Jan. 24, 2019, which claims priority to Chinese patent application No. 201810129197.7, filed on Feb. 8, 2018, and entitled "METHOD, APPARATUS, AND SYSTEM FOR UPDATING GEOMAGNETIC INFORMATION", all of which are incorporated herein by reference in their entirety.

FIELD OF THE TECHNOLOGY

Embodiments of the present disclosure relate to the field of electronic technologies, and in particular, to a method, an apparatus, and a system for updating geomagnetic information.

BACKGROUND OF THE DISCLOSURE

With the development of electronic technologies and Internet technologies, a terminal such as a mobile phone and a computer has been widely used, and there are also increasingly more types and functions of application programs on the corresponding terminal. A map application is a commonly used application.

A user may perform indoor positioning through a terminal installed with a map application. Specifically, a correspondence between a geographical location and geomagnetic information may be prestored in a server. During the positioning, the server may determine, from the foregoing correspondence, the geographical location corresponding to the geomagnetic information currently detected by the terminal, to obtain the current geographical location of the user. In some cases, geomagnetic information corresponding to some geographical locations may change (for example, when a physical structure of a room changes or an electromagnetic device in a room changes, geomagnetic information corresponding to each geographical location in the room may change). In this case, the geomagnetic information corresponding to the geographical location in the correspondence may be invalid, and correspondingly, the invalid geomagnetic information in the correspondence may be updated. Currently, a method for updating geomagnetic information is generally as follows. A technician may carry the terminal to the geographical location at which the geomagnetic information changes, so that the terminal may re-collect the geomagnetic information of the geographical location, and then may update the correspondence according to the collected geomagnetic information.

During implementation of the embodiments of the present disclosure, the inventor finds at least the following problems existing in the related art.

Based on the method for updating geomagnetic information, each time the geomagnetic information changes, it is necessary to manually re-collect new geomagnetic information, which results in low efficiency of updating the geomagnetic information.

SUMMARY

Embodiments of the present disclosure provide a method, an apparatus, and a system for updating geomagnetic information, which may resolve the problem of low efficiency in updating geomagnetic information in the related art. The technical solutions are as follows.

In one aspect, a method for updating geomagnetic information is performed at a computing device having one or more processors and memory storing a plurality of programs to be executed by the one or more processors, the method including:

receiving target geomagnetic information and target location assistance information that are transmitted by a terminal during positioning, the target geomagnetic information being magnetic field intensity detected by the terminal during positioning;

determining a target geographical location corresponding to the target location assistance information in a case that geomagnetic information corresponding to a current geographical location of the terminal is invalid; and updating geomagnetic information corresponding to the target geographical location according to the target geomagnetic information in a prestored correspondence between a geographical location and geomagnetic information.

In one aspect, a computing device is provided, including one or more processors and memory, the memory storing at least one instruction, at least one program, a code set, or an instruction set, the at least one instruction, the at least one program, the code set, or the instruction set being loaded and executed by the one or more processors to implement the method for updating geomagnetic information.

In one aspect, a non-transitory computer readable storage medium is provided for storing at least one instruction, at least one program, a code set, or an instruction set, the at least one instruction, the at least one program, the code set, or the instruction set being loaded and executed by a processor to implement the method for updating geomagnetic information.

In one aspect, a system for updating geomagnetic information is provided, including a terminal and a server, the server being the foregoing server; and the terminal being the foregoing terminal.

Beneficial effects brought by the technical solutions provided in the embodiments of the present disclosure are as follows.

In the embodiments of the present disclosure, during the positioning, the terminal transmits the detected target geomagnetic information and target location assistance information to the server in real time. Whenever the server receives the target geomagnetic information and the target location assistance information, it may be determined whether the geomagnetic information corresponding to the current geographical location of the terminal is invalid, and if the geomagnetic information is invalid, the server may update the geomagnetic information of the target geographical location in the prestored correspondence. In this way, during the positioning of the server, the correspondence is automatically updated according to the target geomagnetic information sent by the terminal without manually re-collecting the geomagnetic information, thereby improving the efficiency of updating the geomagnetic information.

DESCRIPTION OF EMBODIMENTS

To make the objectives, technical solutions, and advantages of the embodiments of the present disclosure clearer, the following further describes implementations of the embodiments of the present disclosure in detail with reference to the accompanying drawings.

Figure 1:
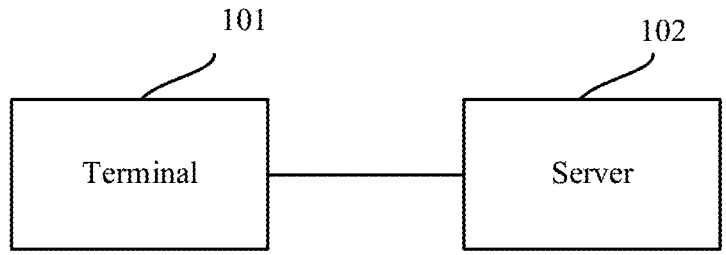
FIG. 1 is a schematic diagram of a system framework according to an embodiment of the present disclosure.

An embodiment of the present disclosure provides a method for updating geomagnetic information. The method may be jointly implemented by a terminal 101 and a server 102. A system framework for implementing the method is shown in FIG. 1. The terminal 101 may be a terminal with an indoor positioning function, for example, a terminal such as a mobile phone or a tablet computer with a map application installed. The server 102 may be a background server having an indoor positioning function, for example, may be a background server with the map application, and the server 102 may communicate with the terminal 101.

The terminal 101 may include components such as a processor, a memory, a screen, a transceiver, and the like. The processor may be a central processing unit (CPU) and the like, which may be configured to obtain target geomagnetic information and target location assistance information. The memory may be a random access memory (RAM), a flash (flash memory) or the like, which may be configured to store received data, data required for processing, data generated during processing, and the like. The screen may be configured to display an interface of the map application, and the like. The transceiver may be used for data transmission with other devices, for example, transmit the acquired target geomagnetic information and target location assistance information to the server, which may include an antenna, a matching circuit, a modem, and the like. The server 102 may include components such as a processor, a memory, a transceiver, and the like. The processor may be a CPU, or the like, which may be configured to update the geomagnetic information corresponding to the target geographical location. The memory may be a RAM, a flash, or the like, which may be configured to store received data, data required for processing, data generated during processing, for example, a correspondence between a geographical location and the geomagnetic information, and the like. The transceiver may be used for data transmission with the terminal or other servers, for example, receive target geomagnetic information and target location assistance information sent by the terminal, and the transceiver may include an antenna, a matching circuit, a modem, and the like.

In the related art, whenever geomagnetic information corresponding to some geographical locations changes, a technician is required to carry the terminal to the geographical location at which the geomagnetic information changes, so that the geomagnetic information corresponding to the geographical location in the prestored correspondence is updated, which often requires re-collecting geomagnetic information in more geographical locations, causing lower update efficiency. However, in this solution, during the positioning, the server automatically updates, according to the target geomagnetic information and the target location assistance information sent by the terminal, the geomagnetic information corresponding to the geographical location at which the geomagnetic information is invalid, so that the efficiency of updating may be improved.

Figure 2:
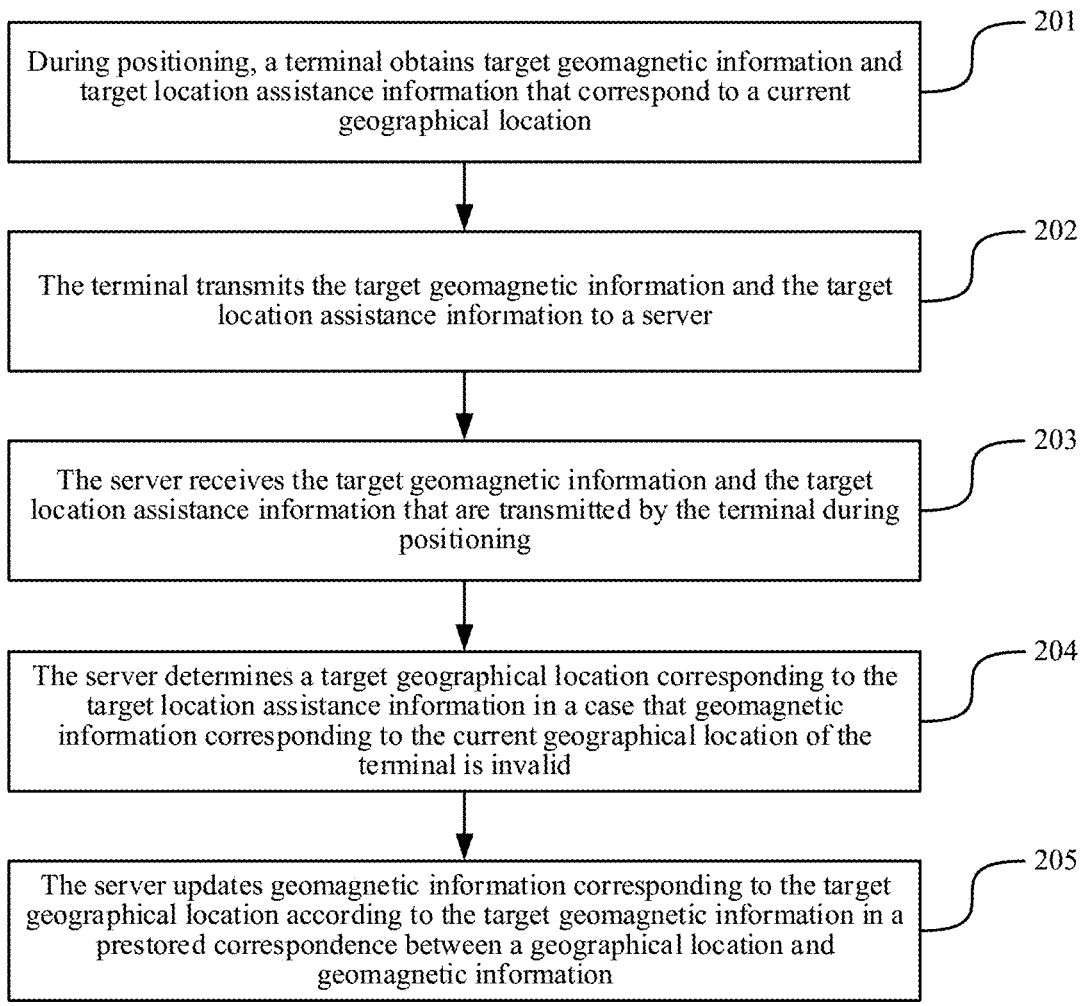
FIG. 2 is a flowchart of a method for updating geomagnetic information according to an embodiment of the present disclosure.

The following describes the processing flow shown in FIG. 2 in detail with reference to specific implementations, with the content as follows.

Step 201: A terminal obtains, during positioning, target geomagnetic information and target location assistance information that correspond to a current geographical location.

The target location assistance information may be location assistance information currently detected by the terminal, or may be information used by the server to determine information about a corresponding target geographical location. Geomagnetic information may be magnetic field intensity, and the target geomagnetic information may be magnetic field intensity detected by the terminal during positioning.

During implementation, a map application may be installed in the terminal, and a user may perform indoor positioning through the map application. During the positioning, the terminal may obtain the geomagnetic information (which may be referred to as the target geomagnetic information, the target geomagnetic information may be sensor data detected by a magnetometer sensor and may be a result obtained through superposition of magnetic fields generated by a geomagnetic field and other devices at the geographical location) corresponding to the current geographical location in real time through a magnetometer. In addition, the terminal may further obtain location assistance information (which may be referred to as target location assistance information) corresponding to the current geographical location. The target location assistance information may be information used by the server to determine the corresponding geographical location in a case that the server cannot determine the geographical location through the target geomagnetic information.

Optionally, the target location assistance information may be sensor data used for calculating pedestrian dead reckoning (PDR) information. The sensor data may include acceleration data and angular velocity data, where the acceleration data may be obtained through an accelerometer, and the angular velocity data may be obtained through a gyroscope. Alternatively, the target location assistance information may be Wireless Fidelity (Wi-Fi) signal information (for example, a signal identifier and signal strength of the detected Wi-Fi signal). Alternatively, the target location assistance information may be Bluetooth signal information (for example, which may be a signal identifier and signal strength of the detected Bluetooth signal).

PDR is an algorithm that measures and counts the number of steps, a step size, and a direction of a walker, and calculates information such as walking tracks and locations of the walker. PDR information may be information such as the number of steps, a step size, and the direction of the walker relative to a geographical location.

Step 202: The terminal transmits the target geomagnetic information and the target location assistance information to a server.

Figure 3:
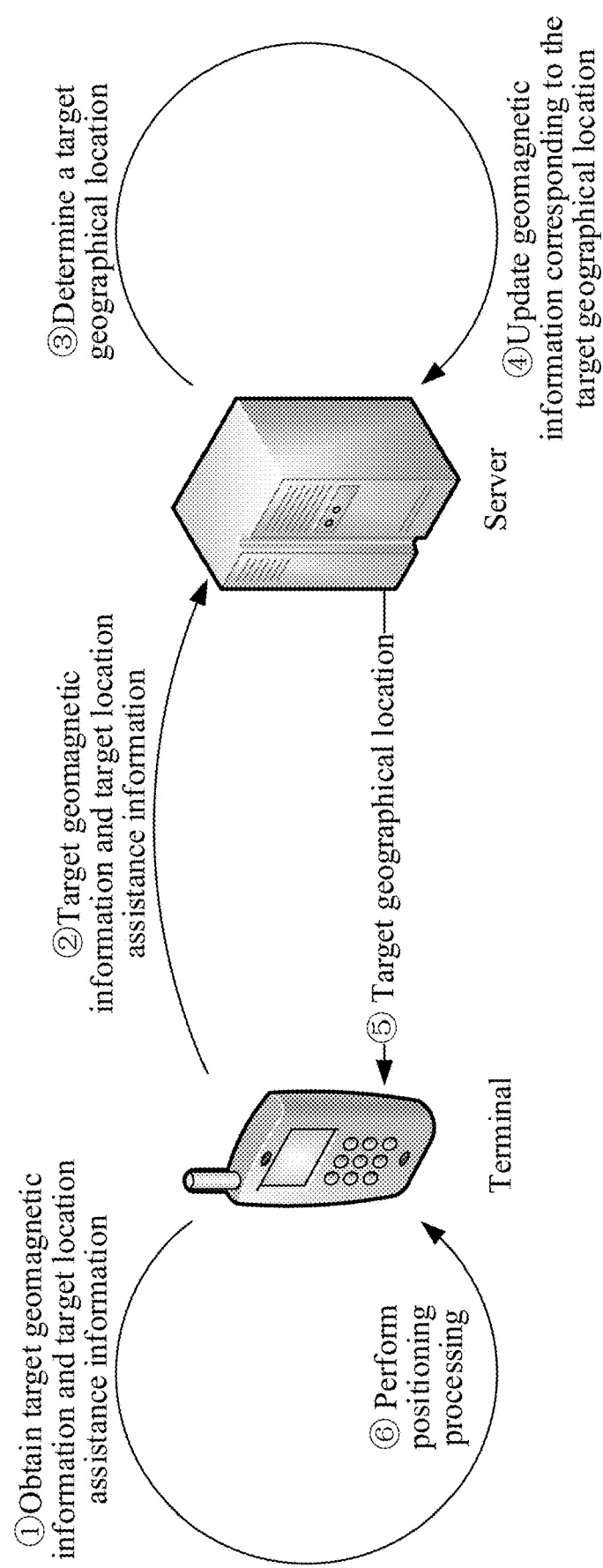
FIG. 3 is a schematic diagram of a system framework according to an embodiment of the present disclosure.

During implementation, after obtaining the target geomagnetic information and the target location assistance information each time, the terminal may transmit the target geomagnetic information and the target location assistance information to the server, as shown in FIG. 3.

Step 203: The server receives the target geomagnetic information and the target location assistance information that are transmitted by the terminal during positioning.

During implementation, after the terminal transmits the target geomagnetic information and the target location assistance information to the server, the server may receive the target geomagnetic information and the target location assistance information that are transmitted by the terminal during positioning.

Step 204: The server determines a target geographical location corresponding to the target location assistance information in a case that geomagnetic information corresponding to a current geographical location of the terminal is invalid.

During the implementation, the server may prestore a correspondence between each geographical location and geomagnetic information. The geographical location in the correspondence may be indicated by latitude and longitude, or may be indicated by latitude, longitude, and floor. The foregoing correspondence may also be referred to as a geomagnetic fingerprint library. Each geographical location and corresponding geomagnetic information may be used as a geomagnetic fingerprint. In other words, in the geomagnetic fingerprint library, each geographical location corresponds to a piece of unique geomagnetic information, and the geomagnetic information is like a fingerprint of the geographical location and may also be referred to as the geomagnetic fingerprint of the geographical location. After receiving the target geomagnetic information and the target location assistance information, the server may determine whether the geomagnetic information corresponding to the current geographical location of the terminal is invalid (a determining method of the server is described below). That is, the server may determine whether the geomagnetic information corresponding to the current geographical location of the terminal in the foregoing correspondence is invalid, and if the geomagnetic information is invalid, the server may determine the target geographical location corresponding to the target location assistance information.

For example, the server prestores each geographical location at which the corresponding geomagnetic information in the foregoing correspondence is invalid. In other words, the server prestores the following correspondence: a geographical location 1 corresponds to geomagnetic information 1, a geographical location 2 corresponds to geomagnetic information 2, and a geographical location 3 corresponds to geomagnetic information 3. However, the geomagnetic information 1, the geomagnetic information 2, and the geomagnetic information 3 in these correspondences all are invalid. In this case, after receiving the target geomagnetic information and the target location assistance information, the server may calculate the target geographical location corresponding to the target location assistance information (where a specific calculation process is to be described in detail later, that is, the target geographical location may be determined as the current geographical location of the terminal). Then, the server determines whether the calculated target geographical location is in the foregoing invalid correspondence. If the calculated target geographical location is in the foregoing invalid correspondence, and the geomagnetic information corresponding to the target geographical location is inconsistent with the target geomagnetic information received by the server in the correspondence, the geomagnetic information corresponding to the target geographical location in the correspondence relationship has become invalid. Furthermore, it may be determined whether each geographical location at which the prestored corresponding geomagnetic information is invalid includes the target geographical location. If the geographical location includes the target geographical location, the server may determine that the geomagnetic information corresponding to the target geographical location corresponding to the target location assistance information is invalid, and may further obtain the calculated target geographical location.

In other words, the server may determine, through the received target geomagnetic information and target location assistance information, whether the geomagnetic information in the geomagnetic fingerprint library is invalid. For example, after the server obtains the target geomagnetic information and the target location assistance information, a geographical location is first calculated based on the target location assistance information, the calculated geographical location is referred to as the target geographical location, and then geomagnetic information (may be referred to as geomagnetic information m) corresponding to the target geographical location is found from the foregoing geomagnetic fingerprint library. If the geomagnetic information m is consistent with the target geomagnetic information received by the server, the geomagnetic information corresponding to the target geographical location in the geomagnetic fingerprint library is not invalid. However, if the geomagnetic information m is inconsistent with the target geomagnetic information received by the server, the geomagnetic information corresponding to the target geographical location in the geomagnetic fingerprint library is invalid.

Optionally, the target location assistance information may be acceleration data and angular velocity data used for calculating pedestrian dead reckoning (PDR) information, where the acceleration data may be obtained through an accelerometer, and the angular velocity data may be obtained through a gyroscope. Alternatively, the target location assistance information may be Wireless Fidelity (Wi-Fi) signal information (for example, a signal identifier and signal strength of the detected Wi-Fi signal). Alternatively, the target location assistance information may be Bluetooth signal information (for example, which may be a signal identifier and signal strength of the detected Bluetooth signal).

Optionally, the server may not only determine, according to the received target geomagnetic information and the target location assistance information, whether the geomagnetic information is invalid, but also may further determine, according to a matching degree between the target geomagnetic information and the geomagnetic information in the geomagnetic fingerprint library, whether the geomagnetic information corresponding to the geographical location is invalid. For example, when the matching degree between the target geomagnetic information and each piece of geomagnetic information in the foregoing correspondence is relatively small, it may be determined that the geomagnetic information corresponding to the current geographical location of the terminal is invalid. Correspondingly, the processing process may be as follows: calculating a matching degree between target geomagnetic information and each piece of to-be-matched geomagnetic information in the correspondence according to the prestored correspondence between a geographical location and geomagnetic information; and determining that the geomagnetic information corresponding to the current geographical location of the terminal is invalid in a case that each calculated matching degree is less than a preset matching degree threshold.

During implementation, after receiving the target geomagnetic information and the target location assistance information, the server may determine the to-be-matched geomagnetic information in the prestored correspondence between the geographical location and the geomagnetic information, and may further calculate a matching degree between the target geomagnetic information and the determined to-be-matched geomagnetic information. In other words, after the server receives the target geomagnetic information and the target location assistance information, a plurality of pieces of to-be-matched geomagnetic information (or all the geomagnetic information may be directly selected from the geomagnetic fingerprint library) is first selected from the geomagnetic fingerprint library (that is, the correspondence prestored in the server). Then, the server may calculate the matching degree between the target geomagnetic information and the plurality of pieces of to-be-matched geomagnetic information. After obtaining each matching degree, the server may compare each matching degree and a preset matching degree threshold. If the maximum matching degree in each matching degree is greater than or equal to the preset matching degree threshold, the geographical location corresponding to the geomagnetic information corresponding to the maximum matching degree in the foregoing correspondence (that is, the geomagnetic fingerprint library) may be determined as the current geographical location to be sent to the terminal. Correspondingly, after receiving the current geographical location sent by the server, the terminal may perform positioning processing based on the current geographical location.

TABLE 1

Correspondence table between geographical location and geomagnetic information

| Geographical location | Geomagnetic information |
| --- | --- |
| Geographical location 1 | Geomagnetic information 1 |
| Geographical location 2 | Geomagnetic information 2 |
| . . . | . . . |
| Geographical location i | Geomagnetic information i |
| . . . | . . . |
| Geographical location n | Geomagnetic information n |

For example, the server stores the geomagnetic fingerprint library of the correspondence table between a geographical location and geomagnetic information as shown in Table 1. After receiving the target geomagnetic information, the server first compares the target geomagnetic information with a plurality of pieces of geomagnetic information 1, geomagnetic information 2, . . . , geomagnetic information i, . . . , geomagnetic information n in Table 1, respectively, to obtain the matching degree between the target geomagnetic information and the foregoing to-be-matched geomagnetic information. For example, the matching degree between the geomagnetic information 1 and the target geomagnetic information is the matching degree 1, the matching degree between the geomagnetic information 2 and the target geomagnetic information is the matching degree 2, the matching degree between the geomagnetic information i and the target geomagnetic information is the matching degree i, and so on. Then, the server determines a maximum matching degree from the foregoing plurality of matching degrees, for example, the matching degree 2 is the maximum matching degree. Then the server determines a relationship between the matching degree 2 and the prestored preset matching degree threshold. If the matching degree 2 is greater than or equal to the preset matching degree threshold, the server then determines, based on the geomagnetic information 2 corresponding to the matching degree 2 and the correspondence between the geomagnetic information and the geographical location in Table 1, a geographical location 2 corresponding to the geomagnetic information 2, determines the geographical location 2 as the current geographical location, and transmits the geographical location to the terminal. After receiving the current geographical location sent by the server, the terminal may perform positioning processing based on the current geographical location.

However, in a case that each matching degree is less than a preset matching degree threshold, the server may determine that the geomagnetic information corresponding to the current geographical location of the terminal is invalid, and may further determine the target geographical location corresponding to the target location assistance information. After determining the target geographical location corresponding to the target location assistance information, the server may further transmit the target geographical location to the terminal, so that the terminal may perform positioning processing based on the target geographical location.

For example, the server determines the relationship between the maximum matching degree 2 and the prestored preset matching degree threshold. If the matching degree 2 is less than the preset matching degree threshold, it indicates that the geomagnetic information corresponding to the current geographical location is invalid. Then the server determines the target geographical location based on the received target location assistance information, and transmits the target geographical location to the terminal. After receiving the target geographical location sent by the server, the terminal may perform positioning processing based on the target geographical location. Moreover, after determining the target geographical location based on the target location assistance information, the server may further update the geomagnetic information corresponding to the target geographical location in Table 1, for example, update old geomagnetic information corresponding to the target geographical location in Table 1 to the received target geomagnetic information (described in detail below).

In order to improve the efficiency of determining the geographical location by the server, correspondingly, an amount of to-be-matched geomagnetic information may be reduced. In other words, the server may determine the geomagnetic information corresponding to a matching region as the to-be-matched geomagnetic information. Further, the server does not need to calculate the matching degree between the target geomagnetic information and all the geomagnetic information, but only needs to calculate the matching degree between the target geomagnetic information and the geomagnetic information corresponding to the matching region, thereby reducing the amount of calculation and improving the efficiency of determining the geographical location. Details may be as follows.

Optionally, for a case that the target location assistance information is the sensor data, correspondingly, the processing process of determining the to-be-matched geomagnetic information may be as follows: calculating first PDR information according to the sensor data; determining a first geographical location corresponding to the first PDR information according to the first PDR information; determining, according to the first geographical location corresponding to the first PDR information and the prestored correspondence between a geographical location and geomagnetic information, a matching region covering the first geographical location; and determining, as to-be-matched geomagnetic information, each piece of geomagnetic information corresponding to each geographical location in the correspondence in the matching region.

During implementation, after receiving the target geomagnetic information and the target location assistance information that are transmitted by the terminal, the server may determine a starting point corresponding to the target location assistance information (that is, sensor data). The server may determine, as the starting point corresponding to the target location assistance information, the geographical location finally determined through the target geomagnetic information till a present moment (the present moment is a moment at which the target location assistance information is received).

For example, after the terminal transmits the target geomagnetic information and the target location assistance information to the server for the first time, the server determines a geographical location A according to the target geomagnetic information in the foregoing correspondence in the foregoing manner. After the terminal transmits the target geomagnetic information and the target location assistance information to the server for the second time, when the server receives the target geomagnetic information and the target location assistance information for the second time, A may be determined as the starting point corresponding to the target location assistance information received this time. If the server cannot determine the geographical location according to the foregoing correspondence, that is, the geomagnetic information corresponding to the target geographical location corresponding to the target location assistance information received this time is invalid, the server determines the current geographical location B according to the target location assistance information, then after transmitting the target geomagnetic information and the target location assistance information to the server for the third time, the server may still determine A as the starting point corresponding to the target location assistance information received this time (because the geographical location B is not determined through the target geomagnetic information in the correspondence). However, if the server may determine the current geographical location B in the foregoing correspondence for the second time according to the target geomagnetic information received this time, after the terminal transmits the target geomagnetic information and the target location assistance information to the server for the third time, the server may determine B as the starting point corresponding to the target location assistance information received this time.

After the starting point is determined, the server may obtain each piece of target location assistance information received from a moment the target location assistance information corresponding to the starting point is received to a current moment. For example, if the server receives the target location assistance information corresponding to the starting point at a moment t1 and the target location assistance information at a current moment t2, then the server may obtain all target location assistance information within the time period from t1 to t2. Furthermore, the server may determine, through processing such as posture rotation, denoising, and the like, PDR information (which may be referred to as first PDR information) corresponding to the currently received target location assistance information according to each piece of target location assistance information. The first PDR information includes information such as the number of steps, the step size, the direction, and the like relative to the starting point.

After obtaining the first PDR information corresponding to the target location assistance information, the server may determine, based on the geographical location of the starting point and the calculated first PDR information, the first geographical location corresponding to the first PDR information, where the first geographical location may be directly determined according to the target location assistance information. After determining the first geographical location, the server may determine, in geographical locations in the foregoing correspondence, a geographical location whose distance from the first geographical location is less than a preset distance threshold, to obtain a matching region composed of the determined geographical locations. After the matching region is determined, the server may determine, as to-be-matched geomagnetic information, geomagnetic information corresponding to each geographical location in the correspondence in the matching region. In this way, a search range may be narrowed, so that efficiency of calculating the matching degree may be improved.

In addition, as described above, the server may further determine all the geomagnetic information in the correspondence as to-be-matched geomagnetic information.

Optionally, for a case that the target location assistance information is the sensor data, after it is determined that the geomagnetic information corresponding to the current geographical location of the terminal is invalid, the server may further determine an invalid distance corresponding to the sensor data. Correspondingly, a specific processing process may be as follows: determining an invalid distance corresponding to the sensor data; and obtaining a first geographical location corresponding to first PDR information obtained through calculation based on the sensor data in a case that the invalid distance corresponding to the sensor data is less than a preset distance threshold, and using the first geographical location as the target geographical location.

The invalid distance corresponding to the sensor data may be a distance in which the corresponding geomagnetic information is continuously invalid.

During the implementation, as described above, the server may determine, through the matching degree between the target geomagnetic information and each piece of to-be-matched geomagnetic information, whether the geomagnetic information corresponding to the geographical location is invalid. If the server determines that the geomagnetic information corresponding to the geographical location is invalid, that is, after it is determined that each matching degree is less than the preset matching degree threshold, the server may further determine the first PDR information (where if the first PDR information has been calculated before the foregoing matching degree is calculated, the first PDR information that has been calculated may be directly obtained herein. If the first PDR information has not been calculated before, then the first PDR information may be calculated according to the sensor data) corresponding to the sensor data. Furthermore, the invalid distance corresponding to the sensor data may be determined based on the first PDR information. For the foregoing processing method for updating the starting point, the invalid distance corresponding to the sensor data may be the product of the number of steps and the step size in the first PDR information. After the invalid distance is determined, the server may compare the determined invalid distance with the preset distance threshold. Because the accuracy of the geographical location determined through the PDR information is relatively high within the short distance range, if the invalid distance corresponding to the sensor data is less than the preset distance threshold, the server may obtain a first geographical location (where if the first geographical location corresponding to the first PDR information has already been calculated before the foregoing matching degree is calculated, the calculated first geographical location may be directly obtained. If the geographical location corresponding to the first PDR information has not been calculated before, the first geographical location may be calculated according to the first PDR information) corresponding to the first PDR information, and determine the first geographical location as the target geographical location.

Optionally, in the case of a relatively large invalid distance, in order to improve the accuracy of the geographical location determined using the PDR information, for example, if the invalid distance corresponding to the sensor data is greater than the preset distance threshold, the server may determine, as the target geographical location, a second geographical location corresponding to second PDR information. Correspondingly, the specific processing process may include: obtaining the sensor data, and obtaining road network information corresponding to a previous determined geographical location in a case that the invalid distance corresponding to the sensor data is greater than the preset distance threshold; determining second PDR information corresponding to the sensor data according to the sensor data and the road network information corresponding to the previous geographical location; and calculating a second geographical location corresponding to the second PDR information, and using the second geographical location as the target geographical location.

During implementation, if the invalid distance corresponding to the sensor data is greater than the preset distance threshold, in order to improve the accuracy of the geographical location determined using PDR information, the first geographical location corresponding to the first PDR information may no longer be determined as the current geographical location, and the second geographical location corresponding to the sensor data may be determined as the target geographical location. Specifically, the server may obtain road network information corresponding to the previous determined geographical location (where the previous geographical location may be a geographical location determined when the target geomagnetic information and the sensor data are received last time, and the geographical location may be a target geographical location determined according to the target geomagnetic information received last time or determined according to the corresponding sensor data), and the sensor data received this time.

The road network information may be a direction of a road segment in which the previous geographical location is located, or a direction of a road segment near the previous geographical location.

After the server obtains the sensor data and the road network information, the direction in the road network information may diverge while being limited to a course when PDR information is calculated, to obtain the second PDR information (that is, the second PDR information is PDR information corresponding to the sensor data determined by introducing the road network information, and the first PDR information is PDR information corresponding to the sensor data determined without introducing the road network information) corresponding to the sensor data. For example, the direction in the road network information corresponding to the previous geographical location is a southward direction, and a probability of determining the southward direction based on sensor data is 0.45 and a probability of determining an eastward direction is 0.55. In this case, the server may determine the southward direction as a direction in the second PDR information, instead of determining the eastern direction with a larger probability value as the direction in the second PDR information. After determining the second PDR information, the server may determine the previous geographical location as the starting point corresponding to the sensor data. Furthermore, the second geographical location corresponding to the second PDR information may be calculated based on the geographical location corresponding to the starting point and the second PDR information. Then, the server may use the second geographical location as the target geographical location.

Step 205: The server updates geomagnetic information corresponding to the target geographical location according to the target geomagnetic information in a prestored correspondence between a geographical location and geomagnetic information.

During the implementation, after the target geographical location is determined, the server may determine the geomagnetic information corresponding to the target geographical location in the foregoing correspondence, and may further update the determined geomagnetic information according to the target geomagnetic information. For example, before the update, the geomagnetic information corresponding to the target geographical location is geomagnetic information A, and after the update, the geomagnetic information corresponding to the target geographical location is target geomagnetic information.

Optionally, for a case that the second geographical location is determined as the target geographical location, correspondingly, the processing process of step 205 may be as follows: correspondingly storing the second geographical location and the target geomagnetic information in a cache; obtaining each second geographical location and target geomagnetic information stored in the cache in a case that a quantity of second geographical locations or a quantity of pieces of target geomagnetic information in the cache reaches a preset quantity threshold; performing clustering processing on each piece of target geomagnetic information corresponding to each second geographical location, to obtain each piece of target geomagnetic information corresponding to an optimal class; determining corrected geomagnetic information corresponding to the second geographical location according to each piece of target geomagnetic information corresponding to the optimal class; and replacing, with the corrected geomagnetic information, the geomagnetic information corresponding to the second geographical location in a prestored correspondence between a geographical location and geomagnetic information.

During the implementation, after determining the second geographical location, the server may correspondingly store the determined second geographical location and the target geomagnetic information received this time in the cache as a corresponding relationship item in the cache. After receiving the target geomagnetic information and target location assistance information that are transmitted by other terminals, the server may also determine a corresponding second geographical location by using the foregoing processing method, and correspondingly store the second geographical location and the target geomagnetic information in the cache. The server may detect a quantity of corresponding relationship items (the second geographical location or target geomagnetic information) in the cache. When it is detected that the quantity of corresponding relationship items in the cache reaches a preset quantity threshold, the server may obtain each second geographical location and the target geomagnetic information that are stored in the cache.

Further, for each second geographical location, the server may perform clustering processing on each piece of target geomagnetic information corresponding to the second geographical location, to obtain each piece of target geomagnetic information corresponding to an optimal class. Specifically, the server may perform clustering processing on each piece of target geomagnetic information corresponding to each second geographical location, to obtain at least two classes including the same quantity of pieces of target geomagnetic information. Then the server determines a class with a smallest intra-class spacing and a largest inter-class spacing as an optimal class, and determines all the target geomagnetic information in the optimal class. The optimal class may be a class with a relatively small intra-class spacing and a large inter-class spacing. The intra-class spacing is a spacing between each piece of target geomagnetic information in the same class. For example, the intra-class spacing between target geomagnetic information 1 and target geomagnetic information 2 that belong to the same class is a spacing between the target geomagnetic information 1 and the target geomagnetic information 2. The inter-class spacing is the spacing between different classes, which may be calculated by using an average intra-class spacing. For example, an inter-class spacing between class 1 and class 2 is a spacing between an average intra-class spacing of class 1 and an average intra-class spacing of class 2. For each second geographical location, after obtaining the target geomagnetic information corresponding to the optimal class, the corrected geomagnetic information corresponding to the second geographical location may be determined based on the target geomagnetic information corresponding to the optimal class. Further, the geomagnetic information corresponding to the second geographical location in the foregoing correspondence may be updated to corrected geomagnetic information.

In addition, the server may also directly update the geomagnetic information corresponding to the second geographical location in the correspondence to the target geomagnetic information.

Optionally, for a case that the first geographical location is determined as the target geographical location, correspondingly, the processing process of step 205 may be as follows: replacing, with the target geomagnetic information, the geomagnetic information corresponding to the first geographical location in a prestored correspondence between a geographical location and geomagnetic information.

Optionally, the corrected geomagnetic information may be average geomagnetic information of each piece of target geomagnetic information. Correspondingly, the processing process may be as follows: calculating average geomagnetic information of each piece of target geomagnetic information corresponding to the optimal class, and determining the average geomagnetic information as the corrected geomagnetic information corresponding to second geographical location.

During the implementation, for each second geographical location, after obtaining the target geomagnetic information corresponding to the optimal class, the server may calculate the average geomagnetic information of each piece of target geomagnetic information in the optimal class, and further determine the average geomagnetic information as the corrected geomagnetic information corresponding to the second geographical location.

Optionally, the server may further prestore an update condition, and correspondingly, the processing process may be as follows: determining the corrected geomagnetic information corresponding to the second geographical location according to each piece of target geomagnetic information corresponding to the optimal class in a case that the optimal class satisfies a preset update condition.

During implementation, for each second geographical location, after the optimal class is determined, it may be determined whether the optimal class satisfies a preset update condition. The preset update condition may be an intra-class spacing threshold and an inter-class spacing threshold. In this case, after the optimal class is determined, it may be determined whether the intra-class spacing of the optimal class is less than the intra-class spacing threshold and whether the inter-class spacing is greater than the inter-class spacing threshold. If the intra-class spacing of the optimal class is less than the inter-class spacing threshold and the inter-class spacing is greater than the inter-class spacing threshold, the server may determine the corrected geomagnetic information corresponding to the second geographical location according to the target geomagnetic information corresponding to the optimal class. For example, the average geomagnetic information of each piece of target geomagnetic information in the optimal class is determined as the corrected geomagnetic information corresponding to the second geographical location.

In this embodiment of the present disclosure, during the positioning, the terminal transmits the detected target geomagnetic information and target location assistance information to the server in real time. Whenever the server receives the target geomagnetic information and the target location assistance information, it may be determined whether the geomagnetic information corresponding to the current geographical location of the terminal is invalid, and if the geomagnetic information is invalid, the server may update the geomagnetic information of the target geographical location in the prestored correspondence. In this way, during the positioning of the server, the correspondence is automatically updated according to the target geomagnetic information sent by the terminal without manually re-collecting the geomagnetic information, thereby improving the efficiency of updating the geomagnetic information.

Figure 4:
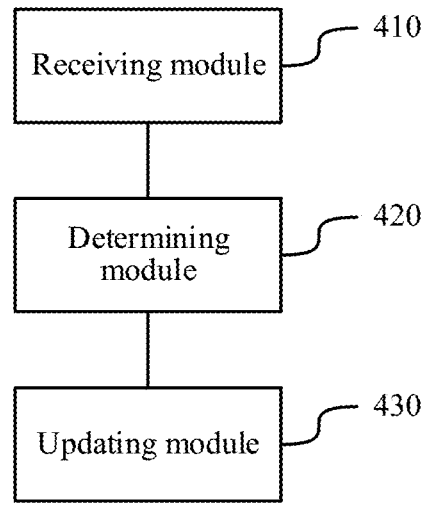
FIG. 4 is a schematic structural diagram of an apparatus for updating geomagnetic information according to an embodiment of the present disclosure.

Based on the same technical concept, an embodiment of the present disclosure further provides an apparatus for updating geomagnetic information. The apparatus may be the foregoing server. As shown in FIG. 4, the apparatus includes:

a receiving module 410 configured to receive target geomagnetic information and target location assistance information that are transmitted by a terminal during positioning, the target geomagnetic information being magnetic field intensity detected by the terminal during positioning;

a determining module 420 configured to determine a target geographical location corresponding to the target location assistance information in a case that geomagnetic information corresponding to a current geographical location of the terminal is invalid; and an updating module 430 configured to update geomagnetic information corresponding to the target geographical location according to the target geomagnetic information in a prestored correspondence between a geographical location and geomagnetic information.

Figure 5:
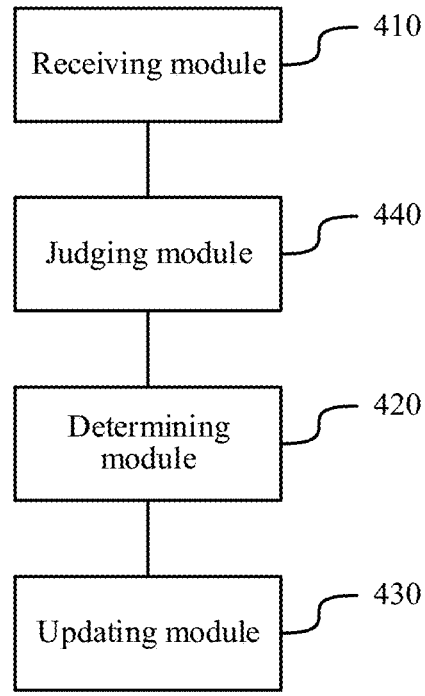
FIG. 5 is a schematic structural diagram of an apparatus for updating geomagnetic information according to an embodiment of the present disclosure.

Optionally, as shown in FIG. 5, the apparatus further includes:

a judging module 440 configured to: calculate a matching degree between the target geomagnetic information and each piece of to-be-matched geomagnetic information in the correspondence according to the prestored correspondence between the geographical location and the geomagnetic information; and determine that the geomagnetic information corresponding to the current geographical location of the terminal is invalid in a case that the calculated matching degree is less than a preset matching degree threshold.

Optionally, the target location assistance information is sensor data, the sensor data being used for calculating pedestrian dead reckoning PDR information.

The determining module 420 is further configured to:

calculate first PDR information according to the sensor data;

determine a first geographical location corresponding to the first PDR information according to the first PDR information;

determine, according to the first geographical location corresponding to the first PDR information and the prestored correspondence between the geographical location and the geomagnetic information, a matching region covering the first geographical location; and determine, as to-be-matched geomagnetic information, each piece of geomagnetic information corresponding to each geographical location in the correspondence in the matching region.

Optionally, the determining module 420 is specifically configured to: determine a starting point corresponding to the current target location assistance information according to the last geographical location determined through the target geomagnetic information in a case that the target location assistance information is received; and determine the first geographical location corresponding to the first PDR information according to the starting point and the first PDR information.

Optionally, the determining module 420 is specifically configured to: determine, in each geographical location included in the correspondence, an adjacent geographical location whose distance from the first geographical location is less than a preset distance threshold; and determine a region composed of the determined geographical locations as a matching region covering the first geographical location.

Optionally, the target location assistance information is sensor data, the sensor data being used for calculating pedestrian dead reckoning PDR information.

The determining module 420 is configured to:

determine an invalid distance corresponding to the sensor data;

obtain a first geographical location corresponding to first PDR information obtained through calculation based on the sensor data in a case that the invalid distance corresponding to the sensor data is less than a preset distance threshold, and use the first geographical location as the target geographical location.

Optionally, the determining module 420 is further configured to:

obtain the sensor data, and obtain road network information corresponding to a previous determined geographical location in a case that the invalid distance corresponding to the sensor data is greater than the preset distance threshold;

determine second PDR information corresponding to the sensor data according to the target location assistance information and the road network information corresponding to the previous geographical location; calculate a second geographical location corresponding to the second PDR information; and use the second geographical location as a target geographical location.

Optionally, the updating module 430 is configured to:

correspondingly store the second geographical location and the target geomagnetic information in a cache;

obtain each second geographical location and the target geomagnetic information stored in the cache in a case that a quantity of second geographical locations or a quantity of pieces of target geomagnetic information in the cache reaches a preset quantity threshold;

perform clustering processing on each piece of target geomagnetic information corresponding to each of second geographical locations, to obtain each piece of target geomagnetic information corresponding to an optimal class;

determine corrected geomagnetic information corresponding to the second geographical location according to each piece of target geomagnetic information corresponding to the optimal class; and update, to the corrected geomagnetic information, the geomagnetic information corresponding to the second geographical location in the prestored correspondence between a geographical location and geomagnetic information.

Optionally, the updating module 430 is configured to:

calculate average geomagnetic information of each piece of target geomagnetic information corresponding to the optimal class, and determine the average geomagnetic information as the corrected geomagnetic information corresponding to the second geographical location.

Optionally, the updating module 430 is configured to:

determine the corrected geomagnetic information corresponding to the second geographical location according to each piece of target geomagnetic information corresponding to the optimal class in a case that the optimal class satisfies a preset update condition.

Optionally, the updating module 430 is specifically configured to: perform clustering processing on each piece of target geomagnetic information corresponding to each second geographical location, to obtain at least two classes including the same quantity of pieces of target geomagnetic information;

determine a class with a smallest intra-class spacing and a largest inter-class spacing as an optimal class; and determine all target geomagnetic information in the optimal class.

Figure 6:
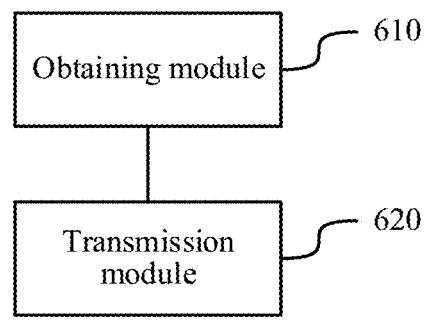
FIG. 6 is a schematic structural diagram of an apparatus for updating geomagnetic information according to an embodiment of the present disclosure.

Based on the same technical concept, an embodiment of the present disclosure further provides an apparatus for updating geomagnetic information. The apparatus may be the foregoing terminal. As shown in FIG. 6, the apparatus includes:

an obtaining module 610 configured to obtain, during positioning, target geomagnetic information and target location assistance information that correspond to a current geographical location, the target geomagnetic information being magnetic field intensity detected by a terminal during positioning; and a transmission module 620 configured to transmit the target geomagnetic information and the target location assistance information to a server, so that the server determines a target geographical location corresponding to the target location assistance information in a case that geomagnetic information corresponding to the current geographical location of the terminal is invalid; and update geomagnetic information corresponding to the target geographical location according to the target geomagnetic information in a prestored correspondence between a geographical location and geomagnetic information.

In this embodiment of the present disclosure, during the positioning, the terminal transmits the detected target geomagnetic information and target location assistance information to the server in real time. Whenever the server receives the target geomagnetic information and the target location assistance information, it may be determined whether the geomagnetic information corresponding to the current geographical location of the terminal is invalid, and if the geomagnetic information is invalid, the server may update the geomagnetic information of the target geographical location in the prestored correspondence. In this way, during the positioning of the server, the correspondence is automatically updated according to the target geomagnetic information sent by the terminal without manually re-collecting the geomagnetic information, thereby improving the efficiency of updating the geomagnetic information.

When the apparatus for updating geomagnetic information provided in the foregoing embodiment updates the geomagnetic information, it is described by taking division of each foregoing function module as an example. For example, in actual application, according to requirements, the foregoing functions may be allocated to different function modules to complete, that is, an internal structure of the terminal or the server is divided into different function modules to complete all or a part of functions in the foregoing descriptions. In addition, the apparatus for updating geomagnetic information and the method embodiment for updating geomagnetic information that are provided in the foregoing embodiment are based on the same concept. For a specific implementation process of the apparatus, reference is made to the method embodiment. Details are not described herein again.

Based on the same technical concept, an embodiment of the present disclosure further provides a system for updating geomagnetic information, including a terminal and a server.

The terminal is configured to: obtain, during positioning, target geomagnetic information and target location assistance information that correspond to a current geographical location; and transmit the target geomagnetic information and the target location assistance information to the server, the target geomagnetic information being magnetic field intensity detected by the terminal during positioning.

The server is configured to: receive the target geomagnetic information and the target location assistance information that are transmitted by the terminal during positioning; determine a target geographical location corresponding to the target location assistance information in a case that geomagnetic information corresponding to a current geographical location of the terminal is invalid; and update geomagnetic information corresponding to the target geographical location according to the target geomagnetic information in a prestored correspondence between a geographical location and geomagnetic information.

In this embodiment of the present disclosure, during the positioning, the terminal transmits the detected target geomagnetic information and target location assistance information to the server in real time. Whenever the server receives the target geomagnetic information and the target location assistance information, it may be determined whether the geomagnetic information corresponding to the current geographical location of the terminal is invalid, and if the geomagnetic information is invalid, the server may update the geomagnetic information of the target geographical location in the prestored correspondence. In this way, during the positioning of the server, the correspondence is automatically updated according to the target geomagnetic information sent by the terminal without manually re-collecting the geomagnetic information, thereby improving the efficiency of updating the geomagnetic information.

Figure 7:
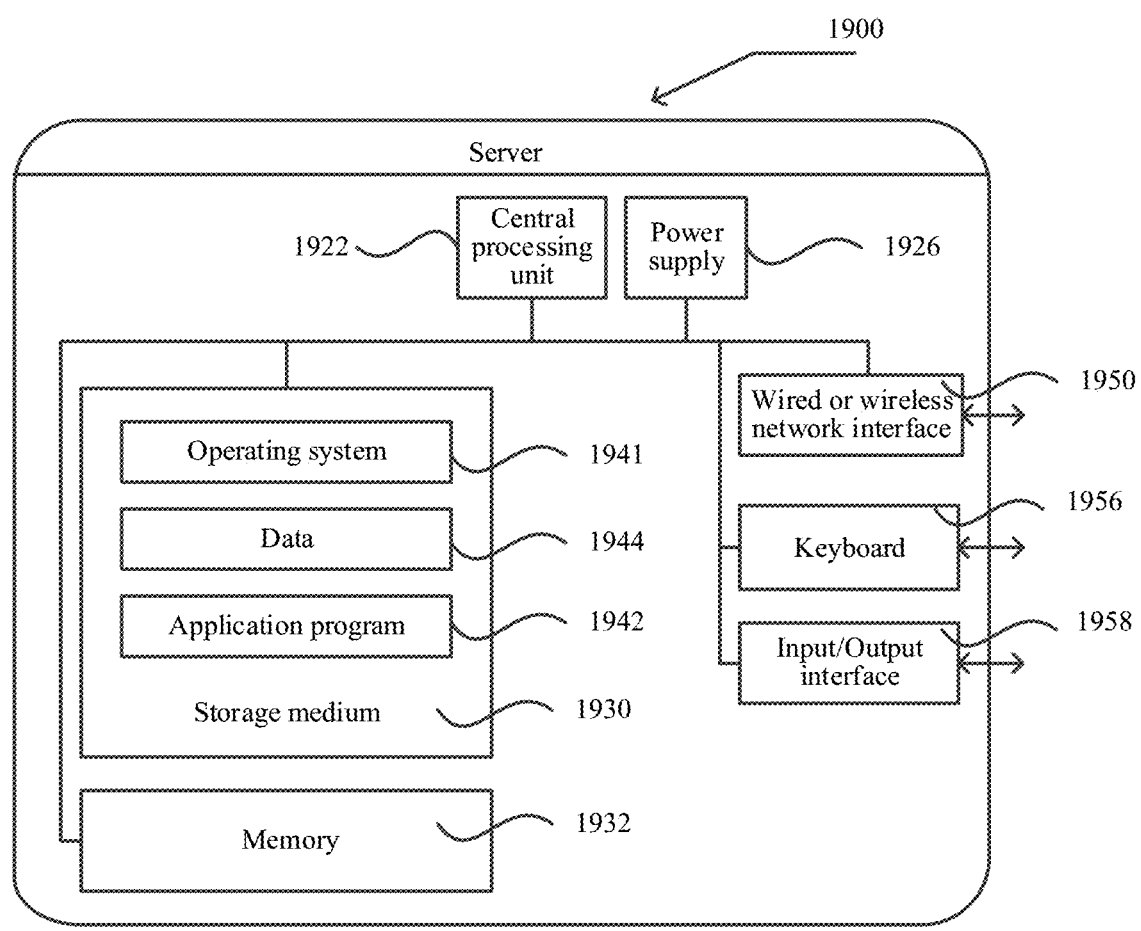
FIG. 7 is a schematic structural diagram of a server according to an embodiment of the present disclosure.

FIG. 7 is a schematic structural diagram of a server according to an embodiment of the present disclosure. The server 1900 may vary considerably depending on configuration or performance, and may include one or more central processing units (CPU) 1922 (for example, one or more processors), a memory 1932, and one or more storage media 1930 (for example, one or more massive storage devices) storing an application program 1942 or data 1944. The memory 1932 and the storage medium 1930 may provide transitory storage or persistent storage. The program stored in the storage medium 1930 may include one or more modules (not shown in the figure), each module including a series of instruction operations on the server. Still further, the central processing unit 1922 may be configured to communicate with the storage medium 1930 to perform the series of instruction operations in the storage medium 1930 on the server 1900.

The server 1900 may further include one or more power sources 1926, one or more wired or wireless network interfaces 1950, one or more input/output interfaces 1958, one or more keyboards 1956, and/or one or more operating systems 1941 such as Windows Server™, Mac OS X™, Unix™, Linux™, FreeBSD™ and the like.

The server 1900 may include a memory, one or more programs, the one or more programs being stored in the memory and being configured to enable one or more processors to execute an instruction that is included in the one or more programs and that is used by the server to update geomagnetic information.

In an exemplary embodiment, a non-transitory computer-readable storage medium including an instruction is further provided, such as a memory including an instruction, the instruction being executed by a processor of a server to complete the foregoing method for updating geomagnetic information. For example, the non-transitory computer readable storage medium may be a read-only memory (ROM), a random access memory (RAM), a compact disc read-only memory (CD-ROM), a magnetic tape, a floppy disk, an optical data storage devices, and the like.

In this embodiment of the present disclosure, during the positioning, the terminal transmits the detected target geomagnetic information and target location assistance information to the server in real time. Whenever the server receives the target geomagnetic information and the target location assistance information, it may be determined whether the geomagnetic information corresponding to the current geographical location of the terminal is invalid, and if the geomagnetic information is invalid, the server may update the geomagnetic information of the target geographical location in the prestored correspondence. In this way, during the positioning of the server, the correspondence is automatically updated according to the target geomagnetic information sent by the terminal without manually re-collecting the geomagnetic information, thereby improving the efficiency of updating the geomagnetic information.

Figure 8:
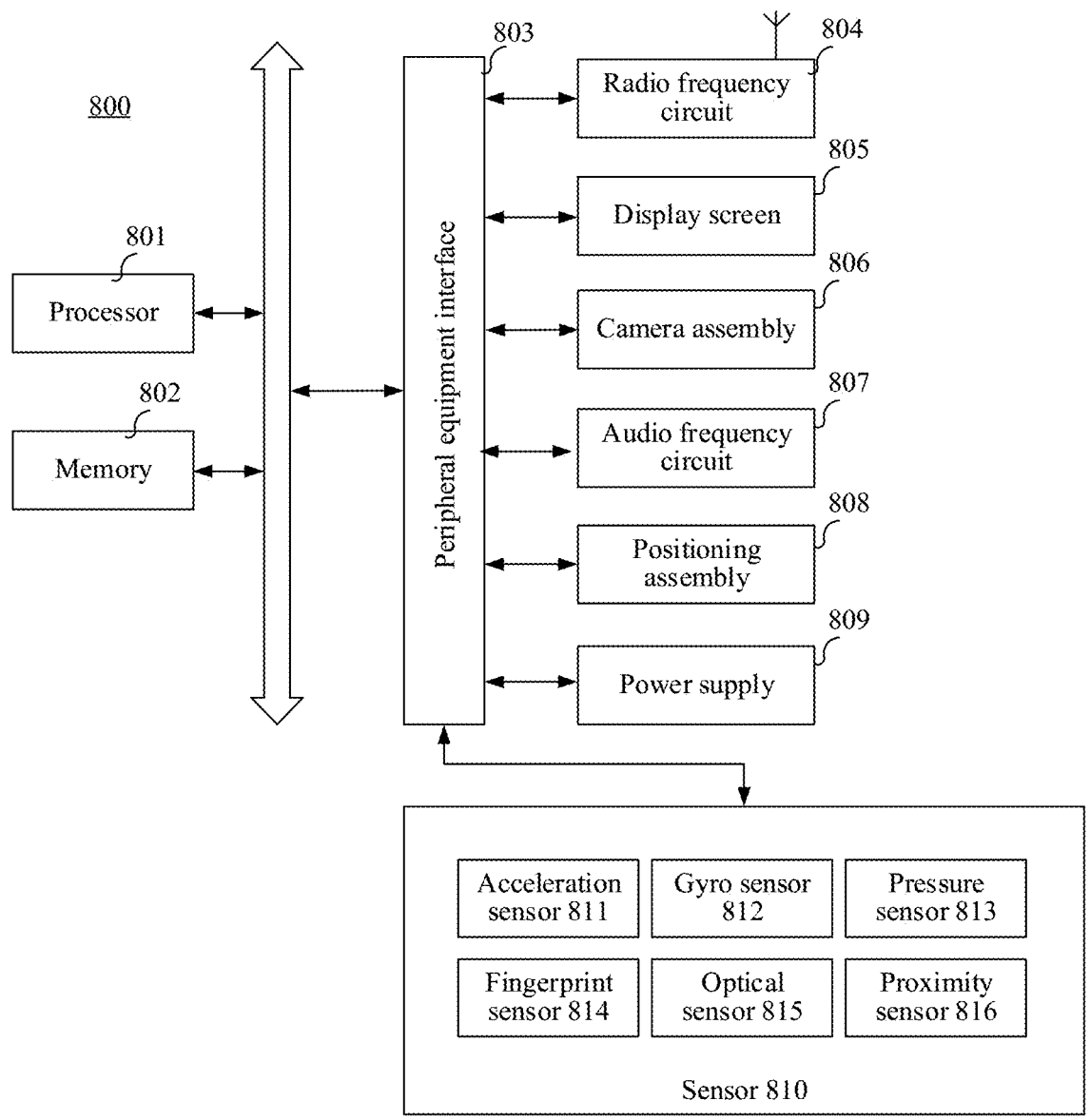
FIG. 8 is a schematic structural diagram of a terminal according to an embodiment of the present disclosure.

FIG. 8 shows a structural block diagram of a terminal 800 according to an exemplary embodiment of the present disclosure. The terminal 800 may be a smartphone, a tablet computer, an e-book reader, a Moving Picture Experts Group Audio Layer III (MP3) player, a Moving Picture Experts Group Audio Layer IV (MP4) player, a laptop computer, or a desktop computer. The terminal 800 may also be referred to as another name such as user equipment, portable terminal, laptop terminal, and desktop terminal.

Generally, the terminal 800 includes a processor 801 and a memory 802.

The processor 801 may include one or more processing cores, for example, a 4-core processor or an 8-core processor. The processor 801 may be implemented by at least one hardware form of a digital signal processor (DSP), a field-programmable gate array (FPGA), and a programmable logic array (PLA). The processor 801 may alternatively include a main processor and a coprocessor. The main processor is configured to process data in an awake state, also referred to as a central processing unit (CPU), and the coprocessor is a low-power processor configured to process data in an idle state. In some embodiments, the processor 801 may be integrated with a graphics processing unit (GPU). The GPU is responsible for rendering and drawing content to be displayed by a display screen. In some embodiments, the processor 801 may further include an artificial intelligence (AI) processor. The AI processor is configured to process a calculation operation related to machine learning.

The memory 802 may include one or more computer-readable storage media. The computer-readable storage media may be non-transient. The memory 802 may further include a high-speed random access memory, and a non-volatile memory such as one or more magnetic disk storage devices and a flash memory device. In some embodiments, the non-transient computer-readable storage medium in the memory 802 is configured to store at least one instruction. The at least one instruction is executed by the processor 801 to perform the method for updating geomagnetic information provided in the method embodiment of this application.

In some embodiments, the terminal 800 may further optionally include a peripheral device interface 803 and at least one peripheral device. The processor 801, the memory 802, and the peripheral device interface 803 may be connected through a bus or a signal cable. Each peripheral device may be connected to the peripheral device interface 803 through a bus, a signal cable, or a circuit board. Specifically, the peripheral device includes: at least one of a radio frequency (RF) circuit 804, a touch display screen 805, a camera component 806, an audio frequency circuit 807, a positioning component 808, and a power supply 809.

The peripheral device interface 803 may be configured to connect at least one peripheral device related to input/output (I/O) to the processor 801 and the memory 802. In some embodiments, the processor 801, the memory 802, and the peripheral device interface 803 are integrated into the same chip or circuit board. In some other embodiments, any one or two of the processor 801, the memory 802, and the peripheral device interface 803 may be implemented on an independent chip or circuit board, and the implementation is not limited in this embodiment.

The radio frequency circuit 804 is configured to receive and transmit a radio frequency (RF) signal, also referred to as an electromagnetic signal. The radio frequency circuit 804 communicates with a communications network and another communications device by using the electromagnetic signal. The radio frequency circuit 804 may convert an electric signal into an electromagnetic signal for transmission, or convert a received electromagnetic signal into an electric signal. Optionally, the radio frequency circuit 804 includes an antenna system, an RF transceiver, one or more amplifiers, a tuner, an oscillator, a digital signal processor, a codec chip set, a subscriber identity module card, and the like. The radio frequency circuit 804 may communicate with another terminal by using a wireless communications protocol. The wireless communication protocol includes, but is not limited to: a metropolitan area network, generations of mobile communication networks (2G, 3G, 4G, and 5G), a wireless local area network and/or a wireless fidelity (Wi-Fi) network. In some embodiments, the radio frequency circuit 804 may further include a near field communication (NFC) related circuit, and is not limited in this application.

The display screen 805 is configured to display a user interface (UI). The UI may include a graph, text, an icon, a video, and any combination thereof. In a case that the display screen 805 is a touch display screen, the display screen 805 is further capable of collecting a touch signal on or over a surface of the display screen 805. The touch signal may be inputted into the processor 801 as a control signal for processing. In this case, the display screen 805 may be further configured to provide a virtual button and/or a virtual keyboard, also referred to as a soft button and/or a soft keyboard. In some embodiments, there is one display screen 805, disposed on a front panel of the terminal 800. In some other embodiments, there may be two display screens 805, respectively disposed on different surfaces of the terminal 800 or designed in a foldable shape. In still some other embodiments, the display screen 805 may be a flexible display screen, disposed on a curved surface or a folded surface of the terminal 800. Even, the display screen 805 may be further set to have a non-rectangular irregular graph, that is, a special-shaped screen. The display screen 805 may be manufactured by using a material such as a liquid crystal display (LCD), an organic light-emitting diode (OLED), or the like.

The camera component 806 is configured to collect an image or a video. Optionally, the camera component 806 includes a front-facing camera and a rear-facing camera. Generally, the front-facing camera is disposed on the front panel of the terminal, and the rear-facing camera is disposed on a back face of the terminal. In some embodiments, there are at least two rear-facing cameras, each being any one of a main camera, a depth of field camera, a wide-angle camera, and a telephoto camera, to implement a Bokeh function through fusion of the main camera and the depth of field camera, panoramic photo shooting and virtual reality (VR) shooting functions through fusion of the main camera and wide-angle camera, or another fusion shooting function. In some embodiments, the camera component 806 may further include a flash. The flash may be a single color temperature flash or a double color temperature flash. The double color temperature flash refers to a combination of a warm flash and a cold flash, and may be configured to perform light ray compensation at different color temperatures.

The audio circuit 807 may include a microphone and a loudspeaker. The loudspeaker is configured to collect sound waves of a user and an environment, and convert the sound waves into electric signals and input the electrical signals into the processor 801 for processing, or input the electrical signals into the radio frequency circuit 804 to implement speech communication. For the purpose of stereo sound collection or noise reduction, there may be a plurality of microphones, respectively disposed at different parts of the terminal 800. The microphone may be further a microphone array or an omnidirectional collection microphone. The loudspeaker is configured to convert electric signals from the processor 801 or the radio frequency circuit 804 into sound waves. The loudspeaker may be a conventional thin-film loudspeaker or a piezoelectric ceramic loudspeaker. In a case that the loudspeaker is the piezoelectric ceramic loudspeaker, electric signals not only can be converted into sound waves that can be heard by human, but also can be converted into sound waves that cannot be heard by human for ranging and the like. In some embodiments, the audio circuit 807 may further include an earphone jack.

The positioning component 808 is configured to position a current geographic location of the terminal 800, to implement a navigation or a location based service (LBS). The positioning assembly 808 may be a positioning assembly based on the United States' Global Positioning System (GPS), China's BeiDou Navigation Satellite System (BDS), Russia's GLObal NAvigation Satellite System (GLONASS) or the European Union's Galileo System.

The power supply 809 is configured to supply power to components in the terminal 800. The power supply 809 may be an alternating current, a direct current, a primary battery, or a rechargeable battery. In a case that the power supply 809 includes the rechargeable battery, the rechargeable battery may support wired charging or wireless charging. The rechargeable battery may be further configured to support a quick charge technology.

In some embodiments, the terminal 800 further includes one or more sensors 810. The one or more sensors 810 include, but are not limited to, an acceleration sensor 811, a gyroscope sensor 812, a pressure sensor 813, a fingerprint sensor 814, an optical sensor 815, and a proximity sensor 816.

The acceleration sensor 811 may detect acceleration on three coordinate axes of a coordinate system established by the terminal 800. For example, the acceleration sensor 811 may be configured to detect components of gravity acceleration on the three coordinate axes. The processor 801 may control, according to a gravity acceleration signal collected by the acceleration sensor 811, the display screen 805 to display the user interface in a frame view or a portrait view. The acceleration sensor 811 may be further configured to collect motion data of a game or a user.

The gyroscope sensor 812 may detect a body direction and a rotation angle of the terminal 800. The gyroscope sensor 812 may cooperate with the acceleration sensor 811 to collect a 3D action by the user on the terminal 800. The processor 801 may implement the following functions according to the data collected by the gyroscope sensor 812: motion sensing (such as changing the UI according to a tilt operation of the user), image stabilization at shooting, game control, and inertial navigation.

The pressure sensor 813 may be disposed at a side frame of the terminal 800 and/or a lower layer of the touch display screen 805. When the pressure sensor 813 is disposed on the side frame of the terminal 800, a holding signal of the user on the terminal 800 may be detected. The processor 801 performs left and right hand recognition or a quick operation according to the holding signal collected by the pressure sensor 813. When the pressure sensor 813 is disposed on the low layer of the display screen 805, the processor 801 controls, according to a pressure operation of the user on the display screen 805, an operable control on the UI. The operable control includes at least one of a button control, a scroll bar control, an icon control, and a menu control.

The fingerprint sensor 814 is configured to collect a fingerprint of the user. The processor 801 identifies an identity of the user according to the fingerprint collected by the fingerprint sensor 814, or the fingerprint sensor 814 identifies an identity of the user according to the collected fingerprint. In a case that the identity of the user is identified as a trusted identity, the processor 801 authorizes the user to perform a related sensitive operation. The sensitive operation includes unlocking a screen, viewing encrypted information, downloading software, payment, changing settings, and the like. The fingerprint sensor 814 may be disposed on a front face, a back face, or a side face of the terminal 800. When a physical button or a vendor logo is disposed on the terminal 800, the fingerprint 814 may be integrated with the physical button or the vendor logo.

The optical sensor 815 is configured to collect ambient light intensity. In an embodiment, the processor 801 may control display luminance of the display screen 805 according to the ambient light intensity collected by the optical sensor 815. Specifically, in a case that the ambient light intensity is relatively high, the display luminance of the display screen 805 is increased. In a case that the ambient light intensity is relatively low, the display luminance of the display screen 805 is reduced. In another embodiment, the processor 801 may further dynamically adjust shooting parameters of the camera component 806 according to the ambient light intensity collected by the optical sensor 815.

The proximity sensor 816 is also referred to as a distance sensor, and is generally disposed on the front panel of the terminal 800. The proximity sensor 816 is configured to collect a distance between the user and the front face of the terminal 800. In an embodiment, in a case that the proximity sensor 816 detects that the distance between the user and the front face of the terminal 800 gradually decreases, the processor 801 controls the touch display screen 805 to switch from a screen-on state to a screen-off state. In a case that the proximity sensor 816 detects that the distance between the user and the front face of the terminal 800 gradually increases, the processor 801 controls the touch display screen 805 to switch from a screen-off state to a screen-on state.

Persons skilled in the art may understand that the structure shown in FIG. 8 constitutes no limitation to the terminal 800, and the terminal 800 may include more or fewer components than those shown in the figure, or some components may be combined, or a different component deployment may be used.

In this embodiment of the present disclosure, during the positioning, the terminal transmits the detected target geomagnetic information and target location assistance information to the server in real time. Whenever the server receives the target geomagnetic information and the target location assistance information, it may be determined whether the geomagnetic information corresponding to the current geographical location of the terminal is invalid, and if the geomagnetic information is invalid, the server may update the geomagnetic information of the target geographical location in the prestored correspondence. In this way, during the positioning of the server, the correspondence is automatically updated according to the target geomagnetic information sent by the terminal without manually re-collecting the geomagnetic information, thereby improving the efficiency of updating the geomagnetic information.

A person of ordinary skill in the art may understand that all or some of steps of the embodiments may be implemented by hardware or a program instructing related hardware. The program may be stored in a computer-readable storage medium. The storage medium may be a read-only memory (ROM), a magnetic disk, a magnetic tape, or an optical disc.

What is claimed is:

1. A method for updating geomagnetic information performed at a computing device having one or more processors and memory storing a plurality of programs to be executed by the one or more processors, the method comprising:

receiving target geomagnetic information and target location assistance information that are transmitted by a terminal during positioning, the target geomagnetic information being magnetic field intensity detected by the terminal during positioning;

determining a target geographical location corresponding to the target location assistance information in a case that geomagnetic information corresponding to a current geographical location of the terminal is invalid; and updating geomagnetic information corresponding to the target geographical location according to the target geomagnetic information in a prestored correspondence between a geographical location and geomagnetic information.

2. The method according to claim 1, further comprising:

calculating a matching degree between the target geomagnetic information and each piece of to-be-matched geomagnetic information in the correspondence according to the prestored correspondence between the geographical location and the geomagnetic information; and determining that the geomagnetic information corresponding to the current geographical location of the terminal is invalid in a case that the calculated matching degree is less than a preset matching degree threshold.

3. The method according to claim 2, wherein the target location assistance information is sensor data, the sensor data being used for calculating pedestrian dead reckoning PDR information; and the method further comprising:

calculating first PDR information according to the sensor data;

determining a first geographical location corresponding to the first PDR information according to the first PDR information;

determining, according to the first geographical location corresponding to the first PDR information and the prestored correspondence between the geographical location and the geomagnetic information, a matching region covering the first geographical location; and determining, as the to-be-matched geomagnetic information, each piece of geomagnetic information corresponding to each geographical location in the correspondence in the matching region.

4. The method according to claim 3, further comprising:

determining a starting point corresponding to the current target location assistance information according to the last geographical location determined through the target geomagnetic information in a case that the target location assistance information is received; and the determining a first geographical location corresponding to the first PDR information according to the first PDR information comprises:

determining the first geographical location corresponding to the first PDR information according to the starting point and the first PDR information.

5. The method according to claim 3, wherein the determining, according to the first geographical location corresponding to the first PDR information and the prestored correspondence between the geographical location and the geomagnetic information, a matching region covering the first geographical location comprises:

determining, in each geographical location comprised in the correspondence, each geographical location whose distance from the first geographical location is less than a preset distance threshold; and determining a region composed of the determined geographical locations as a matching region covering the first geographical location.

6. The method according to claim 1, wherein the target location assistance information is sensor data, the sensor data being used for calculating pedestrian dead reckoning PDR information; and the determining a target geographical location corresponding to the target location assistance information comprises:

determining an invalid distance corresponding to the sensor data; and obtaining a first geographical location corresponding to first PDR information obtained through calculation based on the sensor data in a case that the invalid distance corresponding to the sensor data is less than a preset distance threshold, and using the first geographical location as the target geographical location.

7. The method according to claim 6, further comprising:

obtaining the sensor data, and obtaining road network information corresponding to a previous determined geographical location in a case that the invalid distance corresponding to the sensor data is greater than the preset distance threshold;

determining second PDR information corresponding to the sensor data according to the sensor data and the road network information corresponding to the previous geographical location; and calculating a second geographical location corresponding to the second PDR information, and using the second geographical location as the target geographical location.

8. The method according to claim 7, wherein the updating geomagnetic information corresponding to the target geographical location according to the target geomagnetic information in a prestored correspondence between the geographical location and the geomagnetic information comprises:

correspondingly storing the second geographical location and the target geomagnetic information in a cache;

obtaining each second geographical location and the target geomagnetic information stored in the cache in a case that a quantity of second geographical locations or a quantity of pieces of target geomagnetic information in the cache reaches a preset quantity threshold;

performing clustering processing on each piece of target geomagnetic information corresponding to each of second geographical locations, to obtain each piece of target geomagnetic information corresponding to an optimal class;

determining corrected geomagnetic information corresponding to the second geographical location according to each piece of target geomagnetic information corresponding to the optimal class; and updating, to the corrected geomagnetic information, the geomagnetic information corresponding to the second geographical location in the prestored correspondence between the geographical location and the geomagnetic information.

9. The method according to claim 8, wherein the determining corrected geomagnetic information corresponding to the second geographical location according to each piece of target geomagnetic information corresponding to the optimal class comprises:

calculating average geomagnetic information of each piece of target geomagnetic information corresponding to the optimal class, and determining the average geomagnetic information as the corrected geomagnetic information corresponding to the second geographical location.

10. The method according to claim 8, wherein the determining corrected geomagnetic information corresponding to the second geographical location according to each piece of target geomagnetic information corresponding to the optimal class comprises:
determining the corrected geomagnetic information corresponding to the second geographical location according to each piece of target geomagnetic information corresponding to the optimal class in a case that the optimal class satisfies a preset update condition.

11. The method according to claim 8, wherein the performing clustering processing on each piece of target geomagnetic information corresponding to each second geographical location, to obtain each piece of target geomagnetic information corresponding to an optimal class comprises:
performing clustering processing on each piece of target geomagnetic information corresponding to each second geographical location, to obtain at least two classes comprising the same quantity of pieces of target geomagnetic information;
determining a class with a smallest intra-class spacing and a largest inter-class spacing as an optimal class; and
determining all target geomagnetic information in the optimal class.

12. A computing device, comprising one or more processors and memory, the memory storing at least one instruction, at least one program, a code set, or an instruction set, the at least one instruction, the at least one program, the code set, or the instruction set being loaded and executed by the one or more processors to implement a plurality of operations including:
receiving target geomagnetic information and target location assistance information that are transmitted by a terminal during positioning, the target geomagnetic information being magnetic field intensity detected by the terminal during positioning;
determining a target geographical location corresponding to the target location assistance information in a case that geomagnetic information corresponding to a current geographical location of the terminal is invalid; and
updating geomagnetic information corresponding to the target geographical location according to the target geomagnetic information in a prestored correspondence between a geographical location and geomagnetic information.

13. The computing device according to claim 12, wherein the plurality of operations include:
calculating a matching degree between the target geomagnetic information and each piece of to-be-matched geomagnetic information in the correspondence according to the prestored correspondence between the geographical location and the geomagnetic information; and
determining that the geomagnetic information corresponding to the current geographical location of the terminal is invalid in a case that the calculated matching degree is less than a preset matching degree threshold.

14. The computing device according to claim 13, wherein the target location assistance information is sensor data, the sensor data being used for calculating pedestrian dead reckoning PDR information; and the plurality of operations include:
calculating first PDR information according to the sensor data;
determining a first geographical location corresponding to the first PDR information according to the first PDR information;
determining, according to the first geographical location corresponding to the first PDR information and the prestored correspondence between the geographical location and the geomagnetic information, a matching region covering the first geographical location; and
determining, as the to-be-matched geomagnetic information, each piece of geomagnetic information corresponding to each geographical location in the correspondence in the matching region.

15. The computing device according to claim 14, wherein the plurality of operations further comprise:
determining a starting point corresponding to the current target location assistance information according to the last geographical location determined through the target geomagnetic information in a case that the target location assistance information is received; and
the determining a first geographical location corresponding to the first PDR information according to the first PDR information comprises:
determining the first geographical location corresponding to the first PDR information according to the starting point and the first PDR information.

16. The computing device according to claim 12, wherein the target location assistance information is sensor data, the sensor data being used for calculating pedestrian dead reckoning PDR information; and
the determining a target geographical location corresponding to the target location assistance information comprises:
determining an invalid distance corresponding to the sensor data; and
obtaining a first geographical location corresponding to first PDR information obtained through calculation based on the sensor data in a case that the invalid distance corresponding to the sensor data is less than a preset distance threshold, and using the first geographical location as the target geographical location.

17. A non-transitory computer-readable storage medium, storing at least one instruction, at least one program, and a code set or an instruction set, the instruction, the program, and the code set or the instruction set being loaded and executed by a processor to implement a plurality of operations including:
receiving target geomagnetic information and target location assistance information that are transmitted by a terminal during positioning, the target geomagnetic information being magnetic field intensity detected by the terminal during positioning;
determining a target geographical location corresponding to the target location assistance information in a case that geomagnetic information corresponding to a current geographical location of the terminal is invalid; and
updating geomagnetic information corresponding to the target geographical location according to the target geomagnetic information in a prestored correspondence between a geographical location and geomagnetic information.

18. The non-transitory computer-readable storage medium according to claim 17, wherein the plurality of operations include:
calculating a matching degree between the target geomagnetic information and each piece of to-be-matched geomagnetic information in the correspondence according to the prestored correspondence between the geographical location and the geomagnetic information; and
determining that the geomagnetic information corresponding to the current geographical location of the terminal is invalid in a case that the calculated matching degree is less than a preset matching degree threshold.

19. The non-transitory computer-readable storage medium according to claim 18, wherein the target location assistance information is sensor data, the sensor data being used for calculating pedestrian dead reckoning PDR information; and the plurality of operations include:
calculating first PDR information according to the sensor data;
determining a first geographical location corresponding to the first PDR information according to the first PDR information;
determining, according to the first geographical location corresponding to the first PDR information and the prestored correspondence between the geographical location and the geomagnetic information, a matching region covering the first geographical location; and
determining, as the to-be-matched geomagnetic information, each piece of geomagnetic information corresponding to each geographical location in the correspondence in the matching region.

20. The non-transitory computer-readable storage medium according to claim 17, wherein the target location assistance information is sensor data, the sensor data being used for calculating pedestrian dead reckoning PDR information; and
the determining a target geographical location corresponding to the target location assistance information comprises:
determining an invalid distance corresponding to the sensor data; and
obtaining a first geographical location corresponding to first PDR information obtained through calculation based on the sensor data in a case that the invalid distance corresponding to the sensor data is less than a preset distance threshold, and using the first geographical location as the target geographical location.

* * * * *